United States Patent
Ogura et al.

(10) Patent No.: US 7,056,548 B2
(45) Date of Patent: Jun. 6, 2006

(54) PACKAGED, TEA-BASED BEVERAGES

(75) Inventors: Yoshikazu Ogura, Tokyo (JP); Susumu Ohishi, Tokyo (JP); Kazuhiro Otsuka, Tokyo (JP); Takeshi Yasumasu, Tokyo (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/972,456

(22) Filed: Oct. 26, 2004

(65) Prior Publication Data

US 2005/0095343 A1    May 5, 2005

(30) Foreign Application Priority Data

Oct. 31, 2003    (JP)    ............... 2003-373223

(51) Int. Cl.
*A23F 3/00*    (2006.01)

(52) U.S. Cl. ............... 426/597; 426/106; 426/590

(58) Field of Classification Search ............... 426/597, 426/106, 590
See application file for complete search history.

(56) References Cited

U.S. PATENT DOCUMENTS

| 5,318,986 | A | 6/1994 | Hara et al. | |
| 6,063,428 | A | 5/2000 | Ekanayake et al. | |
| 6,821,536 | B1 * | 11/2004 | Lines et al. | ............... 426/73 |
| 2003/0077374 | A1 * | 4/2003 | Ohishi et al. | ............... 426/597 |
| 2003/0096050 | A1 * | 5/2003 | Inaoka et al. | ............... 426/597 |

FOREIGN PATENT DOCUMENTS

| EP | 1 297 749 A1 | 4/2003 |
| JP | 59-219384 | 12/1984 |
| JP | 60-156614 | 8/1985 |
| JP | 61-130285 | 6/1986 |
| JP | 3-133928 | 6/1991 |
| JP | 4-20589 | 1/1992 |
| WO | WO 2004/000045 A2 | 12/2003 |

OTHER PUBLICATIONS

Li Fei Wang, et al., "Effects of Heat Processing and Storage on Flavanols and Sensory Qualities of Green Tea Beverage", Journal of Agricultural and Food Chemistry, American Chemical Society., vol. 48, No. 9, XP-002227725, 2000, pp. 4227-4232.

* cited by examiner

*Primary Examiner*—Milton I. Cano
*Assistant Examiner*—Adepeju O. Pearse
(74) *Attorney, Agent, or Firm*—Oblon, Spivak, McClelland, Maier & Neustadt, P.C.

(57) ABSTRACT

Provided are packaged, tea-based beverages, which stably contain catechins at high concentration, are free of any salty taste, and have the inherent flavor and taste of tea. They contain the following ingredients (A) and (B):

(A) from 320 mg/500 mL to 1,300 mg/500 mL of non-polymer catechins, and
(B) water, wherein:
(C) the content of non-epicatechins in the non-polymer catechins is from 40 to 80 wt. %,
(D) the content of gallates in the non-polymer catechins is from 35 to 100 wt. %,
(E) the weight ratio of the non-polymer catechins to sodium ions is from 12 to 16, and
(F) the pH is from 5 to 7.

19 Claims, No Drawings

PACKAGED, TEA-BASED BEVERAGES

FIELD OF THE INVENTION

This invention relates to packaged, tea-based beverages which stably contain catechins at high concentration and have good flavor and taste.

BACKGROUND OF THE INVENTION

As effects of catechins, there have been reported a suppressing effect on an increase in cholesterol level and an inhibitory effect on α-amylase activity (see, for example, JP-A-60-156614 and JP-A-03-133928). For such physiological effects to manifest, it is necessary for an adult to drink tea as much as 4 to 5 cups in a day. Accordingly, there has been a demand for technology that enables the addition of catechins at high concentration in beverages to facilitate the ingestion of a large amount of catechins. As one of methods for this, catechins are added in a dissolved form to a beverage by using a green tea concentrate (see, for example, JP-A-59-219384, JP-A-4-20589 and JP-A-61-130285) or the like.

In packaged, tea-based beverages, ascorbic acid or the like is also added to stabilize them.

The addition of ascorbic acid or the like in a large proportion however, has a problem that a salty taste stemming from sodium bicarbonate employed upon adjustment of pH is difficult to avoid.

SUMMARY OF THE INVENTION

The present inventors have proceeded with an investigation to stabilize highly concentrated catechins and also to improve a flavor and taste thereof. As a result, it has been found that a packaged, tea-based beverage, which has not only a reduced salty taste but also a good flavor and taste filled with the adequate bitterness and astringency inherent to tea, can be obtained when the contents of non-epimers and gallates in non-polymer catechins are controlled to particular ranges, and the ratio of the non-polymer catechins to sodium ions is lowered.

In a first aspect of the present invention, there is thus provided a packaged, tea-based beverage containing the following ingredients (A) and (B):
(A) from 320 mg/500 mL to 1,300 mg/500 mL of non-polymer catechins, and
(B) water, wherein:
(C) the content of non-epicatechins in the non-polymer catechins is from 40 to 80 wt. %,
(D) the content of gallates in the non-polymer catechins is from 35 to 100 wt. %,
(E) the weight ratio of the non-polymer catechins to sodium ions is from 12 to 16, and
(F) the pH is from 5 to 7.

In the packaged, tea-based beverage according to the present invention, non-polymer catechins are stably maintained at high concentration, and the packaged, tea-based beverage according to the present invention is free of a salty taste and has the inherent flavor and taste of tea filled with adequate bitterness and astringency.

DETAILED DESCRIPTION OF THE INVENTION

The term "non-polymer catechins" as used herein is a generic term, which collectively encompasses non-epicatechins such as catechin, gallocatechin, catechingallate and gallocatechingallate, and epicatechins such as epicatechin, epigallocatechin, epicatechingallate and epigallocatechingallate.

The packaged, tea-based beverage according to the present invention contains the non-polymer catechins (A), each of which is a non-polymer and is in a dissolved form in water, at from 320 mg/500 mL to 1,300 mg/500 mL, preferably from 320 mg/500 mL to 1,000 mg/500 mL, more preferably from 320 mg/500 mL to 499 mg/500 mL, even more preferably from 360 mg/500 mL to 480 mg/500 mL, still more preferably from 380 mg/500 mL to 480 mg/500 mL, yet still more preferably from 400 mg/500 mL to 480 mg/500 mL. Insofar as the content of non-polymer catechins falls within the above-described range, a great deal of non-polymer catechins can be taken with ease and at the same time the inherent flavor and taste of tea can be provided.

The "concentration of non-polymer catechins" as used herein is defined based on the total amount of eight types of non-polymer catechins consisting of catechin, gallocatechin, catechingallate, gallocatechingallate, epicatechin, epigallocatechin, epicatechingallate and epigallocatechingallate.

In the packaged, tea-based beverage according to the present invention, the content of the non-epicatechins in the non-polymer catechins is required to be from 40 to 80 wt. % from the standpoint of effectively improving the long-term stability, flavor and taste of the packaged, tea-based beverage. The content of the non-epicatechins may be preferably from 46 to 80 wt. %, more preferably from 50 to 80 wt. %, even more preferably from 54 to 80 wt. %. The content of the non-epicatechins is defined as a weight percentage which is obtained by dividing the total value of the concentrations of catechin, gallocatechin, catechingallate and gallocatechingallate by the total value of the concentrations of the non-polymer catechins.

In the packaged, tea-based beverage according to the present invention, those (gallates) selected from epigallocatechingallate, gallocatechingallate, epigallocatechin and gallocatechin account for from 35 to 100 wt. %, preferably from 45 to 100 wt. %, more preferably from 50 to 100 wt. %, even more preferably from 60 to 95 wt. % of the non-polymer catechins for the reasons that the packaged, tea-based beverage according to the present invention can be provided with better flavor and taste while retaining the inherent flavor and taste of tea.

In the packaged, tea-based beverage according to the present invention, the weight ratio of the non-polymer catechins to sodium ions is required to be from 12 to 16 to reduce a salty taste and also to improve a flavor and taste thereof. A ratio smaller than 12 results in a salty taste, while a ratio greater than 16 leads to a reduction in long-term stability. The ratio may be preferably from 12.5 to 15.5, more preferably from 13 to 14.8, even more preferably from 13 to 14.5.

This non-polymer catechins/sodium ratio can be adjusted by the amount of sodium ascorbate to be added and also the amount of a pH adjuster to be added such as sodium bicarbonate. Described specifically, to adjust the pH of high-catechin content of tea-based beverage to 5 to 7, ascorbic acid which is generally used to stably protect packaged tea beverages is used in a large amount. This, however, requires the addition of a great deal of sodium bicarbonate upon adjustment of the pH, which consequently accounts for a salty taste. A need, therefore, arises to make an adjustment such that the total amount of sodium to be contained in the packaged beverage subsequent to its pH adjustment will not become excessive. With respect to this amount of sodium, it is also necessary to pay attention to the balance between bitterness and astringency, which are derived especially from the gallates out of the non-polymer catechins, and a salty taste. It is, therefore, necessary to adjust the weight ratio of non-polymer catechins to sodium to from 12 to 16, preferably from 12.5 to 15.5, more preferably from 13 to 14.8, even more preferably from 13 to 14.5 in the packaged, tea-based beverage.

From the standpoint of the taste and the stability of non-polymer catechins, it is preferred to set the pH of the packaged, tea-based beverage according to the present invention at from 5 to 7 at 25° C. If the pH is lower than 5, the sour taste is too strong for a packaged, tea-based beverage, and is not preferred from the standpoint of flavor and taste.

The packaged, tea-based beverage according to the present invention contains water, and the amount of water in the beverage is preferably not less than 80 wt. %, more preferably not less than 85 wt. %, still more preferably not less than 90 wt. %, even more preferably from 90 to 99.9 wt. %, and particularly preferably from 95 to 99.9 wt. %.

From the stand point of the flavor, taste and external appearance, the turbidity of the packaged, tea-based beverage according to the present invention may preferably be 0.7 or lower. The turbidity may be preferably 0.5 or lower, more preferably 0.1 or lower, even more preferably 0.05 or lower, still more preferably 0.025 or lower. The packaged, tea-based beverage according to the present invention having the low turbidity as described above can be distributed in clear packages, especially as a beverage filled in clear.

It is also preferred to control the content of dietary fibers at 0.5 to 10 wt. %, preferably 1 to 7 wt. %, more preferably 3 to 7 wt. % in the packaged, tea-based beverage according to the present invention to control bitterness and acridness. Examples of the dietary fibers include gum arabic, alginic acid, carageenan, agar, xanthan gum, guar gum, psylium seed husk gum, gellan gum, gelatin, tamarind seed polysaccharides, tara gum, pharcellulan, pectin, locust been gum, polydextrose, and carboxymethylcellulose. Needless to say, the dietary fibers as described herein can be selected from food additives.

The non-polymer catechins for use in the present invention can be obtained by extraction with water or hot water from tea leaves of green tea such as *sencha* (middle-grade green tea), *gyokuro* (shaded green tea) or *tencha* (powdered tea) prepared from green tea leaves obtained from the Genus *Camellia*, for example, *C. sinensis, C. assamica*, the *Yabukita* variety, or a hybrid thereof, semi-fermented tea, which is generally called oolong tea, such as *tekkannon* (Tieguangin), *irotane, ougonkei* (Huangjigui) or *buigancha* (Wuyiyaucha), or fermented tea such as Darjeeling, Assam or Sri Lanka which are collectively called "black tea".

The extraction of tea can be carried out by a conventional method such as stirring extraction. An organic acid or organic acid salt, such as sodium ascorbate, can be added beforehand to water which is to be used upon extraction. It is also possible to make combined use of boiling deaeration or an extraction method which is conducted while bubbling an inert gas such as nitrogen gas to eliminate dissolved oxygen, that is, under a so-called non-oxidizing atmosphere.

As a method for preparing the packaged, tea-based beverage according to the present invention, it is preferred to use a concentrate of a tea extract in a dissolved form in water or to use a tea beverage, which is commonly consumed, and a concentrate of a tea extract in combination. As a medium useful for dissolving the concentrate of the tea extract, water, carbonated water, a tea extract or the like containing non-polymer catechins at a commercial level, or the like can be mentioned. The term "the concentrate of a tea extract" as used herein means one obtained by concentrating an extract of tea leaves in hot water or a water-soluble organic solvent, and as its forms, various forms can be mentioned such as a solid, aqueous solution and slurry. On the other hand, the term "the concentrate of a tea extract" as used herein means those prepared by processes exemplified in detail in JP-A-59-219384, JP-A-4-20589, JP-A-5-260907, JP-A-5-306279 and the like, and as commercial products, "POLYPHENON™" (product of Mitsui Norin Co., Ltd.), "TEAFURAN™" (product of ITO EN, LTD.), "SUNPHENON™" (product of Taiyo Kagaku Co., Ltd.), "SUN OOLONG™" (product of Suntory Limited) can be mentioned. In addition, non-polymer catechins originated from other raw materials, column-purified non-polymer catechins and chemically synthesized non-polymer catechins can also be used.

Non-epicatechins can be obtained by preparing an aqueous solution of an extract of green tea, semi-fermented tea, fermented tea or the like or a concentrate of such a tea extract and subjecting the aqueous solution to heat treatment, for example, at from 40 to 140° C. for from 0.1 minute to 120 hours. From the standpoint of easiness in preparing non-epicatechins, it is preferred to adjust the pH of the solution to 4.5 or higher. As an alternative, a concentrate of a tea extract having a high non-epicatechin content can be used. They can be used either singly or in combination. By such treatment or procedure, the content of non-epicatechins can be controlled.

Examples of the packaged, tea-based beverage according to the present invention include green tea beverages, semi-fermented tea beverages and fermented tea beverages, but green-tea-based beverages are more preferred.

To the packaged, tea-based beverage according to the present invention, it is possible to add, in combination with the ingredients derived from tea, additives—such as antioxidants, flavorants, various esters, organic acids, organic acid salts, inorganic acids, inorganic acid salts, inorganic salts, colorants, emulsifiers, preservatives, seasoning agents, sweeteners, sour seasonings, fruit extracts, vegetable extracts, flower honey extracts, pH regulators and quality stabilizers—either singly or in combination to adjust its flavor, taste and/or quality.

Examples of the sweeteners include sugar, glucose, fructose, isomerized syrup, glycyrrhizin, stevia, aspartame, fructooligosaccharide, galactooligosaccharide, and other oligosaccharides such as cyclodextrins. Usable examples of the cyclodextrins include α-, β- and γ-cyclodextrins and branched α-, β- and γ-cyclodextrins. In addition, artificial sweeteners can also be used.

Examples of the sour seasonings include, in addition to fruit juices and the like extracted from natural sources, citric acid, tartaric acid, malic acid, lactic acid, fumaric acid, and phosphoric acid.

Examples of the inorganic acids and inorganic acid salts include phosphoric acid, disodium phosphate, sodium metaphosphate, and sodium polyphosphate. Examples of the organic acids and organic acid salts include citric acid, succinic acid, itaconic acid, malic acid, and sodium citrate.

Similar to general beverages, a package useful for the packaged, tea-based beverage according to the present invention can be provided in an ordinary form such as a molded package made of polyethylene terephthalate as a principal component (a so-called PET bottle), a metal can, a paper container combined with metal foils or plastic films, or a bottle. Among such packaged, tea-based beverages, a beverage filled in a clear PET package is preferred. Incidentally, the term "packaged beverage" as used here in means a beverage that can be taken without dilution.

The packaged, tea-based beverage according to the present invention can be produced, for example, by filling the tea beverage in a container such as a metal can and, when heat sterilization is feasible, conducting heat sterilization under sterilization conditions as prescribed in the Food Sanitation Act. For those which cannot be subjected to retort sterilization like PET bottles or paper containers, a process is adopted such that the tea beverage is sterilized beforehand under similar sterilization conditions as those described above, for example, by a plate-type heat exchanger, is cooled to a particular temperature, and is then filed in a container. Under aseptic conditions, additional ingredients may be added to and filled in a filled container. It is also possible to conduct an operation such that subsequent to heat sterilization under acidic conditions, the pH of the tea beverage is restored to neutral under a septic conditions or that subsequent to heat sterilization under neutral conditions, the pH of the tea beverage is restored to the acidic side under neutral conditions.

The following examples further describe and demonstrate embodiments of the present invention. The examples are given solely for the purpose of illustration and are not to be construed as limitations of the present invention.

EXAMPLES

Measurement of Non-Polymer Catechins

A high-performance liquid chromatograph (model: SCL-10AVP) manufactured by Shimadzu Corporation was used. The chromatograph was fitted with an LC column packed with octadecyl-introduced silica gel, "L-Column, TM ODS" (4.6 mm in diameter×250 mm in length; product of Chemicals Evaluation and Research Institute, Japan). A beverage, which had been filtered through a filter (0.8 μm), was subjected to chromatography at a column temperature of 35° C. by gradient elution. A 0.1 mol/L solution of acetic acid in distilled water and a 0.1 mol/L solution of acetic acid in acetonitrile were used as mobile phase solution A and mobile phase solution B, respectively. The measurement was conducted under the conditions of 10 μL injected sample quantity and 280 nm UV detector wavelength.

Measurement of Sodium Ions

Atomic fluorescence spectroscopy (extraction with hydrochloric acid)

Each sample (5 g) was placed in 10% hydrochloric acid (to provide a 1% HCl solution when dissolved to a predetermined volume). With deionized water, the resulting solution was then brought to the predetermined volume, and its absorbance was measured.

Wavelength: 589.6 nm
Flame: acetylene-air

Measurement of Turbidity

Using a spectrophotometer (Model: U-2010) manufactured by Hitachi, Ltd., each packaged beverage was placed in a glass cell and measured at 25° C. The measurement wavelength of the spectrophotometer at the time of the analysis was set at 660 nm.

1) Production of a Purified Solution of a Green Tea Extract

A green tea extract concentrate ("POLYPHENON™ HG", product of Tokyo Food Techno Co., Ltd.) hadanon-polymer catechin content of 33.70 wt. %, a caffeine content of 5.5 wt. %, a non-polymer catechins/caffeine ratio of 6.1, a gallates content of 50.7 wt. %, and a sodium concentration of 340 ppm (non-polymer catechins/Na=991). "POLYPHENON™ HG" (100 g, product of Tokyo Food Techno Co., Ltd.) was suspended in a 95% aqueous solution of ethanol (490.9 g) under stirring at 250 rpm at room temperature. After activated carbon "KURARAY COAL™ GLC" (10 g, product of Kuraray Chemical K.K.) and acid clay "MIZKA ACE™ #600" (20 g, product of Mizusawa Chemical Industries, Ltd.) were poured, the resulting mixture was continuously stirred for about 10 minutes. Subsequent to the dropwise addition of a 40% aqueous solution of ethanol (409.1 g) over 10 minutes, stirring was continued for about 30 minutes at room temperature. After the activated carbon and a precipitate were filtered out by No. 2 filter paper, the filtrate was filtered again through a 0.2 μm membrane filter. Finally, deionized water (200 g) was added to the filtrate, ethanol was distilled off at 40° C. under 3.33 kPa, and then, the Brix was adjusted with deionized water to obtain a purified solution.

The thus-obtained purified solution had the following composition: the concentration of non-polymer catechins: 10 wt. %, sodium: 3 mg/kg, and gallates content: 53 wt. %.

2) Production of a Green Tea Extract

A second tea harvest from Kagoshima, which is green tea, was extracted at a bath ratio of 30 at 65° C. for 5 minutes. Subsequent to filtration through a 20-mesh screen, the filtrate was filtered through an 80-mesh screen and finally through a zeta membrane. The thus-obtained green tea extract had the following composition: the concentration of non-polymer catechins: 0.2 wt. %, sodium: 3 mg/kg, and gallates content: 30 wt. %.

Examples 1–3 & Comparative Examples 1–3

Each green tea beverage filled in clear PET packages was prepared by combining the ingredients in accordance with the corresponding formulation in table 1, adjusting the pH of the resultant mixture, sterilizing the mixture at 137° C. for 30 seconds, and then filling the thus-sterilized mixture in 500-mL PET packages.

The beverage obtained as described above was ranked in flavor and taste by 10 expert panelists in accordance with the below-described raking standards. The results are shown in Table 1.

4: There are the inherent flavor and taste of tea accompanied by bitterness and a stringency, and nosalty taste is felt.
3: Bitterness and astringency are low, but a tea-like flavor and taste are felt lightly.
2: No salty taste is felt, but the beverage is poor in tea-like flavor and taste.
1: A salty taste is felt.

Standard 4 or 3 is considered favorable.

TABLE 1

|  |  | Ex. 1 | Ex. 2 | Ex. 3 | Comp. Ex. 1 | Comp. Ex. 2 | Comp. Ex. 3 |
|---|---|---|---|---|---|---|---|
| Formulation |  |  |  |  |  |  |  |
| Purified solution of green tea extract[1] | g | 85 | 300 | 40 | 20 | 20 | 10 |
| Green tea extract[2] | g | 6000 | 7000 | 7000 | 10000 | 12000 | 14000 |
| Sodium ascorbate[3] | g | 7.8 | 21.15 | 8.75 | 20 | 32 | 13.6 |
| Cyclodextrin[4] | g | 52 | 94 | 50 | 80 | 64 | 68 |
| Sodium bicarbonate[5] | g | q.s. | q.s. | q.s. | q.s. | q.s. | q.s. |
| Green tea flavor[6] | g | q.s. | q.s. | q.s. | q.s. | q.s. | q.s. |
| Deionized water | g | Balance | Balance | Balance | Balance | Balance | Balance |
| Total amount | g | 26000 | 47000 | 25000 | 40000 | 32000 | 34000 |
| Post-treatment |  |  |  |  |  |  |  |
| Heat treatment (137° C., 30 sec) |  | Applied | Applied | Applied | Applied | Applied | Applied |
| Analytical data after the post-treatment |  |  |  |  |  |  |  |
| Conc'n of non-polymer catechins | [mg/500 mL] | 386 | 458 | 352 | 269 | 398 | 418 |
| Conc'n of sodium | [mg/500 mL] | 24 | 36 | 28 | 39 | 79 | 32 |
| Cont. of non-epicatechins | [wt. %] | 51 | 53 | 55 | 52 | 50 | 51 |
| Non-polymer catechins/sodium | [-] | 16 | 12.7 | 12.6 | 6.9 | 5.0 | 13.0 |
| Gallates content | [wt.%] | 39.5 | 45.7 | 35.1 | 32 | 31.7 | 31 |
| Turbidity (660 nm) | [-] | 0.013 | 0.02 | 0.012 | 0.009 | 0.013 | 0.18 |
| PH | [-] | 6 | 6 | 6 | 6 | 6 | 6 |
| Ranking results of flavor and taste (shortly after the preparation) |  | 4 | 4 | 4 | 3 | 1 | 2 |

[1] Purified product of "POLYPHENON HG" (product of Tokyo Food Techno Ltd.),
[2] Extract of a second tea harvest from Kagoshima,
[3] Daiichi Fine Chemical Co., Ltd.,
[4] NIHON SHOKUHIN KAKO CO., LTD.,
[5] TOSH CORPORATION,
[6] T. HASEGAWA CO., LTD., As evident from Table 1, the beverage of Comparative Example 1 in which the non-polymer catechins/sodium ratio was small had a salty taste. The beverage of Comparative Example 2 in which the concentration of the non-polymer catechins was low was light in a tea-like flavor and taste. In contrast, the beverages of Examples 1 to 3, all of which meet the requirements of the present invention, had the inherent flavor and taste of tea associated with bitterness and astringency, and was free of a salty taste. In addition, the beverages of Examples 1 and 2 remained stable without any substantial reduction in the content of non-polymer catechins even after a long-term storage.

What is claimed is:

1. A packaged, tea-based beverage comprising the following ingredients (A), (B) and (C):
   (A) from 320 mg/500 mL to 1,300 mg/500 mL of non-polymer catechins comprising non-epicatechins and gallates,
   (B) water, and
   (C) sodium ions, wherein:
      (i) the content of non-epicatechins in said non-polymer catechins is from 40 to 80 wt. %,
      (ii) the content of gallates in said non-polymer catechins is from 35 to 100 wt. %,
      (iii) the weight ratio of said non-polymer catechins to sodium ions is from 12 to 16, and
      (iv) the pH is from 5 to 7.

2. The packaged, tea-based beverage according to claim 1, further comprising ascorbic acid.

3. The packaged, tea-based beverage according to claim 1 or 2, wherein the turbidity is 0.05 or lower, and a package is a clear package.

4. The packaged, tea-based beverage according to claim 3, which is a packaged, green-tea-based beverage.

5. The packaged, tea-based beverage according to claim 3, further comprising from 0.5 to 10 wt. % of dietary fibers.

6. The packaged, tea-based beverage according to claim 1, wherein said non-polymer catechin is at least one selected from the group consisting of catechin, gallocatechin, catechingallate, gallocatechingallate, epicatechin, epigallocatechin, epicatechingallate, epigallocatechingallate and a mixture thereof.

7. The packaged, tea-based beverage according to claim 1, wherein said non-polymer catechins are present in an amount of from 320 mg/500 mL to 1,000 mg/500 mL.

8. The packaged, tea-based beverage according to claim 1, wherein said non-polymer catechins are present in an amount of from 320 mg/500 mL to 499 mg/500 mL.

9. The packaged, tea-based beverage according to claim 1, wherein said non-polymer catechins are present in an amount of from 360 mg/500 mL to 480 mg/500 mL.

10. The packaged, tea-based beverage according to claim 1, wherein the content of non-epicatechins in said non-polymer catechins is from 46 to 80 wt. %.

11. The packaged, tea-based beverage according to claim 1, wherein the content of non-epicatechins in said non-polymer catechins is from 50 to 80 wt. %.

12. The packaged, tea-based beverage according to claim 1, wherein the content of gallates in said non-polymer catechins is from 45 to 100 wt. %.

13. The packaged, tea-based beverage according to claim 1, wherein the content of gallates in said non-polymer catechins is from 50 to 100 wt. %.

14. The packaged, tea-based beverage according to claim 1, wherein the weight ratio of said non-polymer catechins to sodium ions is from 12.5 to 14.5.

15. The packaged, tea-based beverage according to claim 1, wherein the amount of water is not less than 80 wt. %.

16. The packaged, tea-based beverage according to claim 1, wherein the amount of water is not less than 85 wt. %.

17. The packaged, tea-based beverage according to claim 1, wherein the amount of water is not less than 90 wt. %.

18. The packaged, tea-based beverage according to claim 1, wherein the amount of water is 90 to 99.9 wt. %.

19. The packaged, tea-based beverage according to claim 5, wherein said dietary fiber is selected from the group consisting of gum Arabic, alginic acid, carageenan, agar, xanthan gum, guar gum, psylium seed husk gum, gellan gum, gelatin, tararind seed polysaccharides, tara gum, pharcellulan, pectin, locust been gum, polydextrose, carbocymethylcellulose and a mixture thereof.

* * * * *